J. ZUGMAIER & J. WÖRNWAG.
PROCESS FOR THE MANUFACTURE OF WHEELS WITH WIRE SPOKES.
APPLICATION FILED JUNE 27, 1914.
1,149,015.
Patented Aug. 3, 1915.
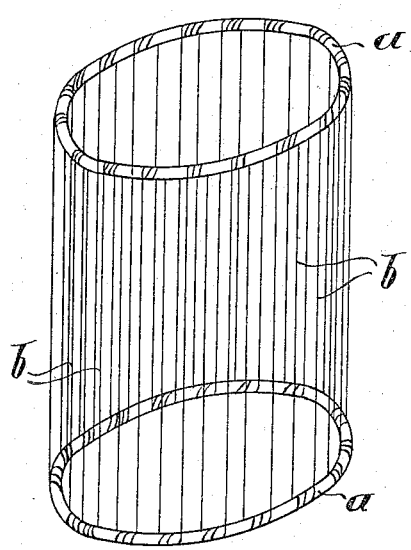
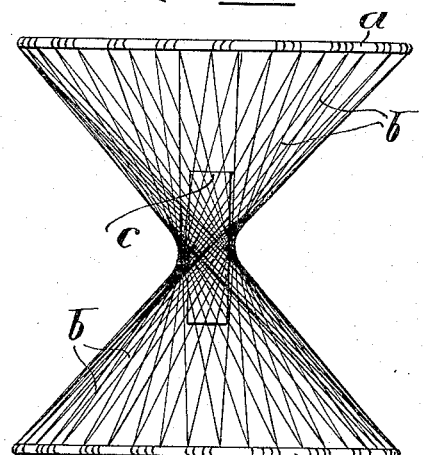
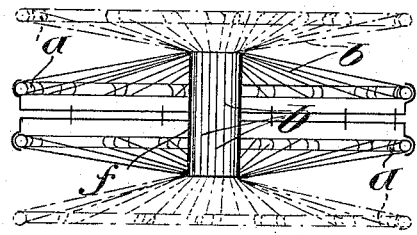
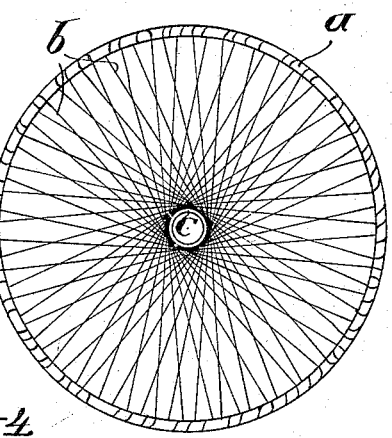
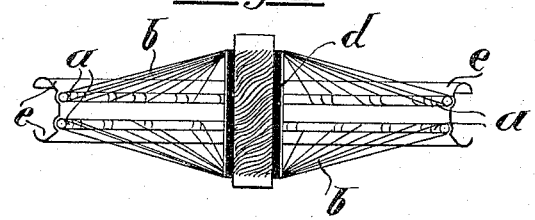
WITNESSES
INVENTORS
JOSEF ZUGMAIER & JAKOB WÖRNWAG
BY
ATTORNEY

UNITED STATES PATENT OFFICE.

JOSEF ZUGMAIER, OF VAIHINGEN, AND JAKOB WÖRNWAG, OF UNTERTÜRKHEIM, GERMANY.

PROCESS FOR THE MANUFACTURE OF WHEELS WITH WIRE SPOKES.

1,149,015.  Specification of Letters Patent.  Patented Aug. 3, 1915.

Application filed June 27, 1914. Serial No. 847,640.

*To all whom it may concern:*

Be it known that we, JOSEF ZUGMAIER and JAKOB WÖRNWAG, citizens of the German Empire, residing, respectively, at Vaihingen and Untertürkheim, in the Kingdom of Wurttemberg, Germany, have invented certain new and useful Improvements in Processes for the Manufacture of Wheels with Wire Spokes; and we do hereby declare the following to be a full, clear, and exact description of the invention, such as will enable others skilled in the art to which it appertains to make and use the same.

The present invention relates to a process for the manufacture of wheels with wire spokes.

According to the invention the spokes are not attached singly between the hub and rim in the usual way but are simultaneously tensioned with a certain amount of constraint. The wires forming the spokes are tensioned in a uniform distribution, over the circumferences of two or more parallel rings of a size corresponding to the wheel which is to be formed; the spokes are arranged so that a cage-like or lattice-like structure results. The rings are then brought closer together by pulling together the middle parts of the spokes between the rings; the parts pulled in are then fastened in the middle, *e. g.* by a sleeve or the like forming the hub after which the rings are drawn together and finally locked in order to prevent springing back.

The spokes can be pulled together between the rings either by twisting the rings with respect to one another, when the wires cross in the middle and thus form the hub together with a sleeve or other suitable member, or else the wires can be directly pulled together by means of a sleeve forming the hub; the wire spokes are then tensioned by axially tensioning the rings and if desired simultaneously twisting the rings.

In the accompanying drawings, Figure 1 is a perspective view of the arrangement of the rings and wires forming the wheel at the beginning of the operation. Figs. 2 and 3 illustrate diagrammatically a further stage in the manufacture of the wire spoke wheels, in elevation and plan of one modification of the process, while Fig. 4 represents a cross-section through the finished wheel made according to such modification. Fig. 5 illustrates diagrammatically the manufacture of a wheel according to a second modification.

According to the invention, rings $a$ are held parallel to one another at any suitable distance by any suitable machine or device; the wires $b$ which are to serve as spokes are so wound or tensioned that the various wires are parallel to one another and distributed uniformly around the periphery of the rings $a$.

The wire may form a connected piece or may be tensioned between the rings in short pieces of suitable length. Further if the wheel is to be elastic, the wire may be given a wave shape or formed as a thin spiral spring. When the wire has been wound on (Fig. 1) the rings $a$ are brought together axially by pulling together the wires in the middle. In the form shown in Figs. 2–4, this is effected by twisting the rings $a$ with respect to one another when the wires interlace in the middle and become wound on a sleeve $c$ serving as the hub (Fig. 2) which sleeve may have a round, square or other cross section. This rotation of the rings $a$ is continued till all the wire has been wound on the hub $c$ except that which is to form the spokes. The wire wound on the sleeve $c$ is then fastened *e. g.* by a sleeve $d$ in two parts, so that when the rings are brought still closer together the wire will not unwind from the hub $c$. If the rotation of the rings is continued till they are fairly close together, they are then locked by screws or in other suitable manner in order to prevent them springing apart after the tension is released, or as shown in Fig. 4 a common tire $e$ is pressed over both. Moreover, the spokes may be further secured in any desired manner so that if one spoke breaks the others will not give way at the same time.

In the form illustrated in Fig. 5, the wires are brought together in the middle by a sleeve $f$ on the inner surface of which the wires lie, and through which the wires may be threaded even when they are being fastened to the rings $a$. On the other hand this sleeve may be made in two parts so that the wires as tensioned in Fig. 1 may be subsequently brought inside the sleeve. The tensioning of the wires forming the spokes is effected in this modification by axially pushing together the rings $a$ or tensioning them with respect to one another, if desired simultaneously twisting them. The further treatment of the wheel is the same as that above described. This second modification is particularly suitable for wheels which have only to overcome comparatively small stresses. The rings *a* may be massive or may be of tubular form. If the wheel is to be specially elastic, these rings may be formed of a wire rope or of thin wires which have been wound together.

We declare that what we claim is:—

1. The process for the manufacture of wheels with wire spokes which comprises attaching lengths of wire between two rings to form a cylindrical lattice, bringing together the middles of said lengths, and then bringing together and securing said rings so as to tension the portions of the wire forming the spokes.

2. The process for the manufacture of wheels with wire spokes which comprises winding parallel lengths of wire between two parallel rings to form a cylindrical lattice, bringing together the middles of said lengths, and then bringing together and securing said rings so as to tension the portions of wire forming the spokes.

3. The process for the manufacture of wheels with wire spokes which comprises applying a plurality of lengths of wire between two rings to form a cylindrical lattice, twisting said lattice to bring together the middles of said lengths, securing said middle portions and bringing together and securing said rings so as to tension the wires which form the spokes.

4. The process for the manufacture of wheels with wire spokes which comprises applying a plurality of lengths of wire between two rings to form a cylindrical lattice, twisting said lattice around a central sleeve to bring together the middles of said lengths, securing said middle portions and bringing together and securing said rings so as to tension the wires which form the spokes.

5. The process for the manufacture of wheels with wire spokes which comprises applying a plurality of lengths of wire between two rings to form a cylindrical lattice, twisting said lattice around a central sleeve to bring together the middles of said lengths, securing said middle portions by a sleeve and bringing together and securing said rings so as to tension the wires which form the spokes.

6. The process for the manufacture of wheels with wire spokes which comprises applying a plurality of lengths of wire between two parallel rings to form a cylindrical lattice, pulling together the middles of said lengths by means of a sleeve, and then pulling and securing together said rings so as to tension the wires forming the spokes.

7. The process for the manufacture of wheels with wire spokes which comprises applying a plurality of lengths of wire to two parallel rings to form a cylindrical lattice, twisting said lattice about a central sleeve, securing the twisted wires upon said sleeve, further twisting the structure and bringing together the rings, and finally securing said rings so that they form the periphery of the wheel.

8. The process for the manufacture of wheels with wire spokes which comprises forming a cylindrical wire lattice upon two rings, constricting the center of said cylinder to form the hub, and bringing together and securing said rings to form the periphery of the wheel and tensioning the spokes thereby.

9. The process for the manufacture of wheels with wire spokes which comprises winding a length of wire backward and forward between two parallel rings and thus forming a cylindrical lattice, constricting the middle of said cylinder to form the hub, and then bringing together and securing said rings so as to tension the spokes.

10. The process for the manufacture of wheels with wire spokes which comprises applying a plurality of lengths of wire between two parallel rings to form a cylindrical lattice, twisting said lattice and pulling together the middles of said lengths by means of a sleeve, and then pulling and securing together said rings so as to tension the wires forming the spokes.

In testimony whereof we affix our signatures, in presence of two witnesses.

JOSEF ZUGMAIER.
JAKOB WÖRNWAG.

Witnesses:
LUDWIG JENNER,
FRIDA BLARBER.

Copies of this patent may be obtained for five cents each, by addressing the "Commissioner of Patents, Washington, D. C."